US009037400B2

(12) United States Patent
Tolstedt et al.

(10) Patent No.: US 9,037,400 B2
(45) Date of Patent: May 19, 2015

(54) VIRTUAL WALKING STICK FOR THE VISUALLY IMPAIRED

(71) Applicants: Jonathan Louis Tolstedt, Fargo, ND (US); Maxwell Louis Tolstedt, Fargo, ND (US)

(72) Inventors: Jonathan Louis Tolstedt, Fargo, ND (US); Maxwell Louis Tolstedt, Fargo, ND (US)

( * ) Notice: Subject to any disclaimer, the term of this patent is extended or adjusted under 35 U.S.C. 154(b) by 0 days.

(21) Appl. No.: 13/925,486

(22) Filed: Jun. 24, 2013

(65) Prior Publication Data

US 2014/0379251 A1 Dec. 25, 2014

Related U.S. Application Data

(60) Provisional application No. 61/664,711, filed on Jun. 26, 2012.

(51) Int. Cl.
G01C 21/20 (2006.01)
A61H 3/06 (2006.01)

(52) U.S. Cl.
CPC .............. *A61H 3/061* (2013.01); *G01C 21/206* (2013.01)

(58) Field of Classification Search
CPC ...................................................... G01C 21/206
See application file for complete search history.

(56) References Cited

U.S. PATENT DOCUMENTS

| | | | | |
|---|---|---|---|---|
| 5,687,136 A * | 11/1997 | Borenstein | ...................... | 367/116 |
| 5,806,017 A * | 9/1998 | Hancock | ........................ | 701/428 |
| 6,320,496 B1 * | 11/2001 | Sokoler et al. | .............. | 340/407.1 |
| 6,671,226 B1 * | 12/2003 | Finkel et al. | ................... | 367/116 |
| 7,039,522 B2 * | 5/2006 | Landau | .......................... | 701/539 |
| 7,267,281 B2 * | 9/2007 | Hopkins | .................. | 235/462.45 |
| 7,446,669 B2 * | 11/2008 | Liebermann | .................... | 340/4.1 |
| 7,778,112 B2 * | 8/2010 | Behm et al. | ..................... | 367/116 |
| 7,991,576 B2 * | 8/2011 | Roumeliotis | ................. | 702/159 |
| 8,140,258 B1 * | 3/2012 | Dempsey | ....................... | 701/467 |
| 8,401,781 B2 * | 3/2013 | Pazos et al. | ................... | 340/10.1 |
| 8,606,316 B2 * | 12/2013 | Evanitsky | ................... | 455/556.1 |
| 8,731,817 B2 * | 5/2014 | Ballew et al. | .................. | 701/409 |
| 2003/0014186 A1 * | 1/2003 | Adams et al. | .................. | 701/207 |
| 2003/0018430 A1 * | 1/2003 | Ladetto et al. | ................ | 701/217 |
| 2005/0099318 A1 * | 5/2005 | Gilfix et al. | .............. | 340/825.19 |
| 2006/0077172 A1 * | 4/2006 | Fukumoto et al. | ............. | 345/156 |
| 2006/0129308 A1 * | 6/2006 | Kates | ............................ | 701/200 |
| 2006/0286972 A1 * | 12/2006 | Kates | ............................ | 455/415 |
| 2006/0293839 A1 * | 12/2006 | Stankieiwcz et al. | ......... | 701/200 |
| 2007/0016425 A1 * | 1/2007 | Ward | ............................ | 704/271 |
| 2007/0069021 A1 * | 3/2007 | Elrod et al. | .................... | 235/451 |
| 2007/0088498 A1 * | 4/2007 | Pazos et al. | ................... | 701/207 |
| 2007/0221731 A1 * | 9/2007 | Ricci | ......................... | 235/462.01 |
| 2008/0040951 A1 * | 2/2008 | Kates | ............................ | 36/136 |
| 2008/0170118 A1 * | 7/2008 | Albertson et al. | .............. | 348/46 |
| 2008/0180267 A1 * | 7/2008 | Kaneko et al. | ............. | 340/686.1 |
| 2008/0309913 A1 * | 12/2008 | Fallon | ......................... | 356/4.01 |
| 2009/0076723 A1 * | 3/2009 | Moloney | ....................... | 701/209 |
| 2009/0122648 A1 * | 5/2009 | Mountain et al. | ............... | 367/93 |
| 2009/0248304 A1 * | 10/2009 | Roumeliotis et al. | ......... | 701/220 |
| 2010/0109918 A1 * | 5/2010 | Liebermann | .................... | 341/21 |
| 2011/0054773 A1 * | 3/2011 | Chi et al. | ...................... | 701/200 |
| 2011/0092249 A1 * | 4/2011 | Evanitsky | ................... | 455/556.1 |
| 2011/0143321 A1 * | 6/2011 | Tran et al. | ..................... | 434/114 |

(Continued)

*Primary Examiner* — Jonathan M Dager
(74) *Attorney, Agent, or Firm* — Jonathan L. Tolstedt

(57) ABSTRACT

A navigational aid for use primarily by the visually impaired in the form of a virtual walking stick, comprising a location sensor and an inertial measurement unit, which can provide angle-dependent navigation directions to a user, and which can be used to record the three-dimensional locations of new objects of interest for later uploading and integration into a global map set of the region.

4 Claims, 6 Drawing Sheets

(56) References Cited

U.S. PATENT DOCUMENTS

| | | | |
|---|---|---|---|
| 2012/0136569 A1* | 5/2012 | Asakawa et al. | 701/431 |
| 2012/0268563 A1* | 10/2012 | Chou et al. | 348/46 |
| 2013/0093852 A1* | 4/2013 | Ye | 348/46 |

* cited by examiner

VIRTUAL WALKING STICK FOR THE VISUALLY IMPAIRED

CROSS REFERENCE TO RELATED APPLICATIONS

This patent application claims the benefit of U.S. Provisional Patent Application No. 61/664,711, entitled, "Virtual walking stick for the visually impaired" by Tolstedt et al., filed on Jun. 26, 2012, which is incorporated herein by reference.

FIELD OF INVENTION

This invention pertains generally to the field of mobility aids for the visually impaired, and specifically to an electronic sensing device for helping a visually impaired pedestrian navigate between locations.

BACKGROUND

There are many efforts to use technology to provide aid—and in particular, navigational aid—to the blind or otherwise visually impaired. The technologies available today, including the global positioning system (GPS) and other global navigation satellite systems (GNSS) and powerful mobile computing platforms, have enabled a range of attempted solutions.

Unfortunately, many of the solutions offered today fall short of ideal. Some are based on a mobile platform such as a smart phone or tablet computer for which the human interface was designed entirely for sighted people. Although it is sometimes possible to purchase modules which can be plugged into these devices to add a Braille interface or to translate visual components into audible directives, this is less than ideal, as the platform itself, the hosting device, was still never intended to be used by someone who cannot see the display. The user interfaces on most devices, in fact, consist almost entirely of a touch screen, in which virtual controls can be displayed in any location and offer no raised edge or surface with can be felt by touch.

Another problem with existing solutions is that many are based on expensive or complex sensing systems, such as sonar, radar, or laser detection, which require setup, mounting, orientation, calibration, and adjustment not easily done by the blind. These systems must also be interfaced to a computer (such as the aforementioned mobile computing platform) that interprets the readings and controls the performance of the sensors. These sensing systems must be mounted to something that must be with the visually impaired person at all times. Some solutions mount the sensors on a walking stick (cane), and others mount them directly on the blind person themselves. These solutions can take the spontaneity out of a quick morning walk around the block, as you have to take time to put the system on, boot it up, and make sure it is working before you leave the house.

Commercial versions of GPS products for the visually impaired include examples such as the Sendero GPS system (Sendero Group, LLC, Roseville, Calif.), Trekker GPS Software (HumanWare Group, Drummondville, Quebec, Canada), StreetTalk GPS Software (Freedom Scientific, St. Petersburg, Fla.), and MobileGeo GPS System (Sendero Group, LLC, Roseville, Calif.), all of which run on a personal data assistant or mobile computing device. These solutions are based on handheld GPS solutions to help the visually-impaired navigate around the city. The systems have varying levels of sophistication and features, but generally provide audible navigation instructions to the user between points of interest or toward a destination to help them get where they are going in an unfamiliar location. These systems are helpful when traveling, but can be expensive and do not provide obstacle detection. They are simply glorified handheld GPS solutions, with software solutions tailored for the visually impaired, but dependent on mobile platforms designed for the fully sighted.

One variation on the GPS approach is a "haptic shoe," a shoe which provides feedback in the form of a mild vibration to the wearer to indicate they should turn in one direction or the other. This solution, although clever and unobtrusive, relies on the same GPS-based computer systems as the previously described solutions to get the actual navigation data, and still has all of their inherent problems.

Other solutions exist or are in development. A research group originally based at the University of Southern California working with Gerard Medioni, a professor in the Institute for Robotics and Intelligent Systems at USC Viterbi, is developing a system which uses head-mounted or body-mounted cameras and special software to build maps of the environment through which a person is walking and identify a safe path through that environment. The solution then alerts the user to obstacles, and to the relative location of those obstacles, by vibrating different parts of a vest worn by the user to indicate the direction of the obstacle. This solution is dependent on the user wearing a lot of sensing and feedback equipment, including a tactile feedback vest, and requires that cameras be mounted on the user's head or other parts of the body. This solution would require time to set up, and is dependent on a lot of complex systems and sensors working together.

The Yissum Research Development Company, Hebrew University's technology transfer firm, has developed a product which adds sonar-like sensors to a walking cane to detect objects in the path where a visually-impaired person is traveling. This system would provide vibration or other feedback to the user to provide an "image" of the immediate environment around the user. This system relies on a complex sensor system, an unobstructed beam which must be pointed in the right direction in order to work, and a controlling computer system that will require setup. Other variations on this approach exist, in which sonar or other emitting sources are used to gauge distance to objects and provide feedback to a user.

What is needed in the art is a navigation aid for the visually impaired which has a simple user interface, designed specifically to be operated by touch and vocal commands, is not dependent on a complex computer system or a lengthy calibration or orientation, does not require the user to wear special clothing or equipment, and which is small, inexpensive, and available to all.

SUMMARY

Accordingly, it is one objective of the present invention to describe a navigational aid for the visually impaired, comprising a location sensor, an inertial measurement unit, a computer processor, a non-volatile memory, a database of map data, and a user interface, wherein the location sensor and the inertial measurement unit are used to compute a location and an orientation of the navigational aid in three-dimensional space, and wherein the navigational aid uses the location and orientation, along with the map data, to provide navigational instructions and angle-dependent directives to a user to locate objects along a travel path.

It is another objective of the present invention to describe a navigational aid for the visually impaired, comprising a location sensor, an inertial measurement unit, a computer processor, a non-volatile memory, a database of map data, a user interface, and a means to record a location of an object in the non-volatile memory, wherein the location of the object is later uploaded to a central server, wherein the location of the object is added to a database of similar location information located on the central server, and wherein the updated location database can be then downloaded from the central server to one or more navigational aids for use.

It is yet another object of the present invention to describe a method of updating a map database comprising the steps of traversing a path with a navigational aid capable of recording location and altitude data, collecting location and altitude data about one or more objects of interest along the path in a memory device connected to the navigational aid, uploading the collected location and altitude data from the memory device to a central server, integrating the uploaded location and altitude data into existing map database, and downloading the updated map database information into one or more navigational aids for future use.

Further objectives and advantages of the invention will become apparent from a consideration of the drawings and ensuing description.

DETAILED DESCRIPTION

Referring now to FIGS. 1 through 5, a new handheld navigation device in the form of a virtual walking stick for use by the visually impaired will be described.

Figure 1:
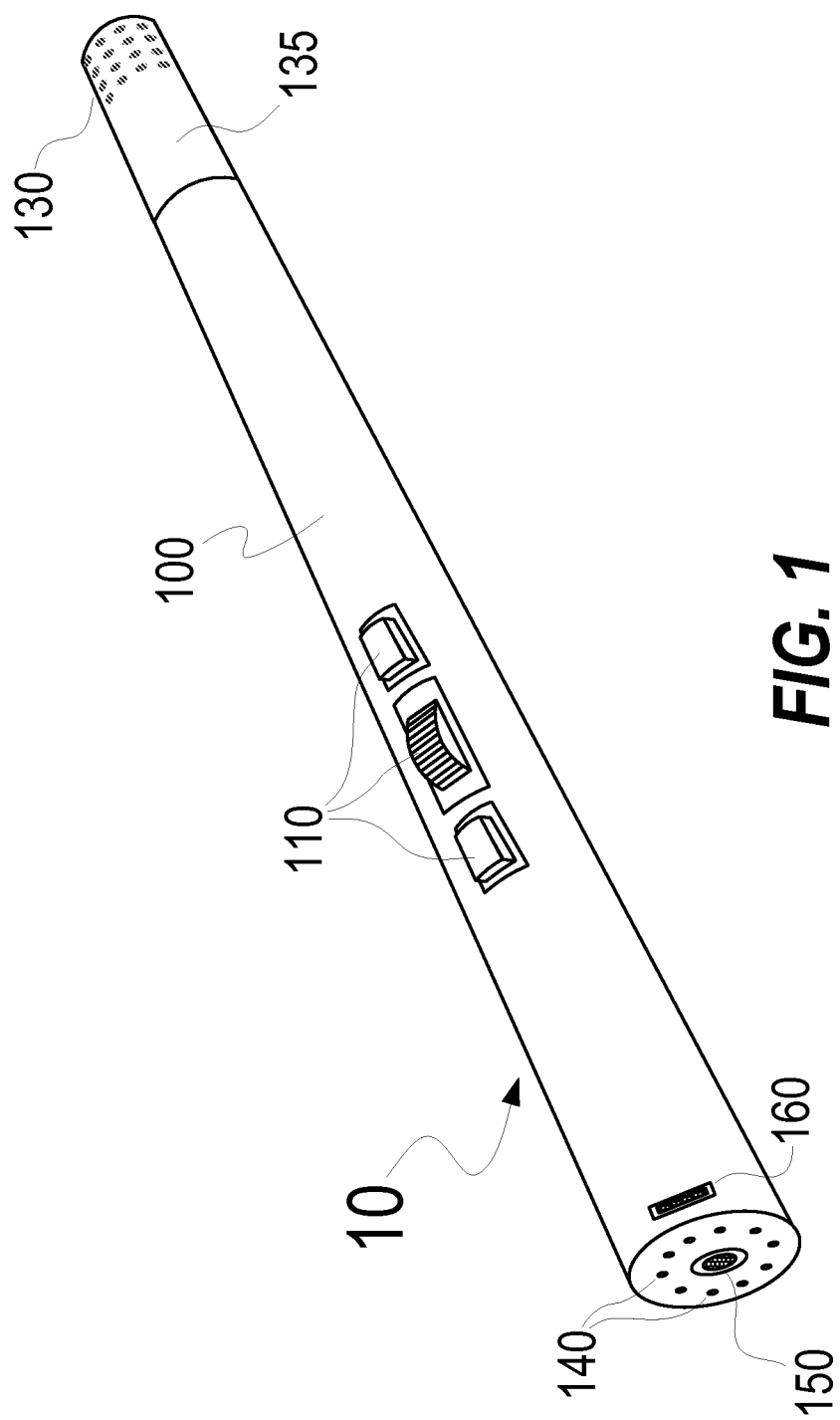
FIG. 1 is a perspective view of one embodiment of a handheld navigation device for the visually impaired as described herein.

FIG. 1 is a perspective view of one embodiment of a handheld navigation device (a virtual walking stick) for the visually impaired. A virtual walking stick 10 provides functions and features that enable a blind or visually impaired person to navigate through a city or other urban location. FIG. 1 will describe the exterior features of one embodiment of the virtual walking stick 10, and FIG. 2 will provide details of the electronic circuitry housed inside of the virtual walking stick 10. After the discussion of both of these figures, additional discussion will be presented on how this navigational aid can be used by someone with no or limited vision to navigate around a city.

Referring to FIG. 1, The virtual walking stick 10 has a barrel 100 that houses electronic circuitry (described in FIG. 2) that controls the functioning of the device. The virtual walking stick 10 has a pointing tip 135. In some embodiments of the virtual walking stick 10, the pointing tip 135 serves the purely mechanical function of providing an end cap to the barrel 100. In other embodiments of the virtual walking stick 10, the pointing tip 135 may house a switch which can be activated when the pointing tip 135 is pressed against a surface, sending an input signal into the electronic circuitry housed inside the barrel 100. In the embodiment shown in FIG. 1, pointing tip 135 houses a microphone 130 that can be used to capture spoken commands and other ambient sounds.

The virtual walking stick 10 offers a variety of user controls 110 that can be used to operate the device. The types of user controls available may include a power switch, a volume control, and a "record" button for recording locations of new points of interest with the virtual walking stick 10, but it would be obvious to a person skilled in the art that any number, type, and variation of user controls can be used. The examples mentioned herein are not meant to be limiting.

The virtual walking stick 10 also offers an audio speaker 140 for broadcasting audible directives to the user, and an optional audio jack 150 where headphones, external speakers, or an ear bud can be plugged in. One or more computer ports 160 are provided to allow the virtual walking stick 10 to be connected to a computer for uploading and downloading of information and charging. Computer port 160 can also be used simply as a recharging port without the need for a computer connection.

It should be noted that other embodiments of the virtual walking stick 10 could be equipped with a wireless data capability instead of or in addition to a hardwired computer connection. This would allow for the virtual walking stick 10 to receive updates and instructions over wireless networks while in use, as well as when at home when not in use.

In the embodiment shown in FIG. 1, the virtual walking stick 10 is handheld, roughly wand- or baton-shaped, and approximately 8-10 inches in length. This embodiment is intended to emulate the handle of an actual walking stick used by a visually-impaired person, and provides a convenient shape for pointing at objects, holding in the hand, speaking into when giving commands, etc. However, it should be noted that this shape is intended to be an example only, and not limiting in any fashion. It would be obvious to one skilled in the art that the same functionality that has been or will be described herein can be achieved using a different form factor without changing the intent of the invention.

Figure 2:
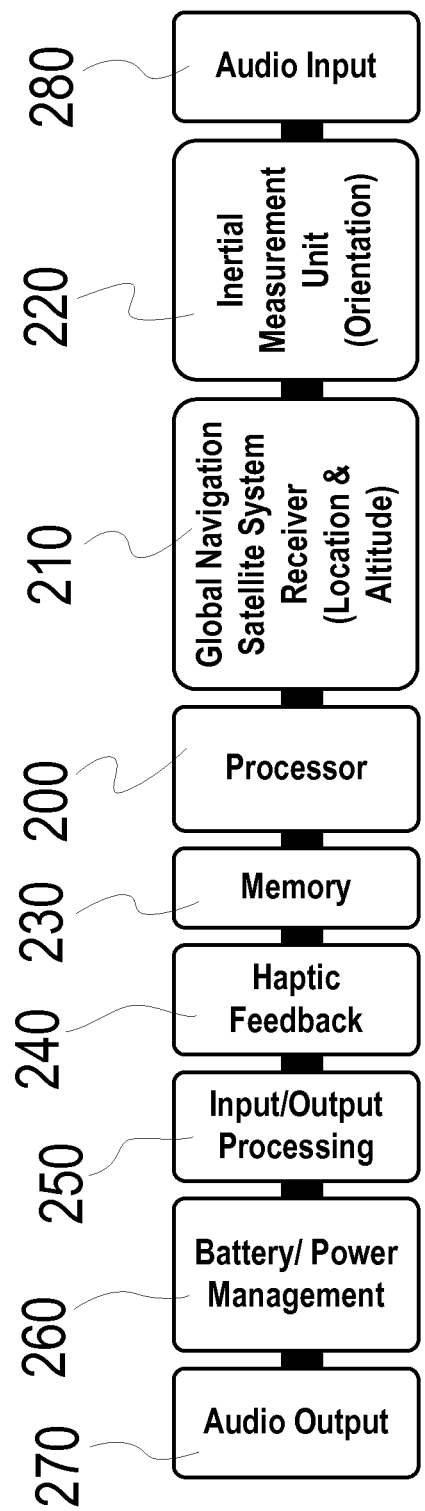
FIG. 2 is a functional block diagram of one embodiment of a handheld navigation device for the visually impaired as described herein.

Having discussed the exterior features of one embodiment of the virtual walking stick 10, we will now refer to FIG. 2, which presents a functional block diagram of the virtual walking stick 10, specifically the functional blocks of the electronic circuitry contained within the barrel 100 (FIG. 1).

A computer processor 200 controls the functions and other circuits of the virtual walking stick 10. This can be any appropriately sized processor, microprocessor, microcontroller, digital signal processor or other processing device that has the required power and functionality to control the various features. One or more non-volatile memory devices 230 is provided for storing data such as map information, device state, and user entered information. The key sensing components of the virtual walking stick 10 are the global navigation satellite system (GNSS) receiver 210 and the inertial measurement unit (IMU) 220. The GNSS receiver 210 is capable of receiving signals from multiple geosynchronous orbiting satellites and using those signals to calculate a location (including a latitude value and a longitude value) and, assuming at least four satellite signals are being received, an altitude. This combination of latitude, longitude, and altitude represents a three-dimensional point in space corresponding to the location of the virtual walking stick 10. An example of a GNSS receiver is a GPS or global positioning system receiver, which receives signals from GPS satellites orbiting the Earth. In some embodiments of the virtual walking stick 10, the GNSS receiver may be augmented with a secondary system, such as a ground-based broadcasting system, which is capable of generating error correction or "augmentation" signals that can be used by the virtual walking stick 10 to increase the accuracy of the calculated three-dimensional position in space. It is likely that this augmentation signal will be required by the virtual walking stick 10 in some embodiments in order to generate a location accurate enough for the proper functioning of the angle-dependent navigation commands generated by the virtual walking stick 10.

Several existing and planned augmentation systems are or will be available to increase the accuracy of the location generated by the virtual walking stick 10, including the Wide-Area Augmentation System (WAAS), European Geostationary Navigation Overlay Service (EGNOS), Multi-functional Satellite Augmentation System (MSAS), and GPS-Aided Geo Augmented Navigation (GAGAN). These augmentation systems will be presented and discussed in additional detail in FIG. 6 and the corresponding text later in this specification.

For now, it is sufficient to state that the GNSS receiver 210 shall be capable of receiving some type of error correction or augmentation signal such that it can generate a location with sufficient accuracy for the virtual walking stick 10 to perform its functions as described herein.

It should be noted that alternate embodiments of the virtual walking stick 10 can exist which generate location information by different means without varying from the intent of the invention as described herein. For example, the Global Positioning System (GPS) mentioned as an example above is but one of several satellite-based systems that can be used for navigation. The GPS system is used widely in the United States today, but is not the only such system. Examples of other similar GNSS systems, either already in use today or planned to be, are GLONASS, GALILEO, Compass, and the Quasi-Zenith Satellite System (QZSS). As these and other future GNSS systems come into use, and offer additional capabilities, it may be that the virtual walking stick 10 will not require a separate augmentation signal. Also, it should be noted that some areas may offer a non-satellite based system for location determination, such as a system which triangulates position from cellular towers or other existing ground-based systems.

Returning now to FIG. 2, the IMU 220 is comprised of sensors that allow the device to sense movement and rotation about the yaw, pitch, and roll axes. These sensors may include both accelerometers (for sensing linear, back-and-forth movement) and gyroscopes (for sensing rotational movement), but these examples are not meant to be limiting. A typical IMU available commercially today may consist of three accelerometers and three gyroscopes, with one accelerometer and one gyroscope mounted on each of the three axes of dimension (length, width, and height). However, variations on this design can and do exist. The purpose of the IMU 220 is to allow the virtual walking stick 10 to know its current orientation (level, tilted, upside down, wobbling, etc.) in space at any given moment.

The combination of the GNSS receiver 210 and the IMU 220 allow the virtual walking stick 10 to be able to calculate its exact position and orientation in the world at any given moment. For example, using these sensors in combination with map data downloaded from the internet and stored in non-volatile memory 230, it could tell when it is being held seven floors above the ground, from a window in Room 737 in Rienow Hall dormitory at the University of Iowa in Iowa City, Iowa, pointing down at the ground directly to the east of the building at an angle of 45 degrees off of horizontal. If the map information stored in the device also included information about the structure of the building itself, the virtual walking stick 10 could then give you instructions that would guide you to the door of the room, out into the hall, down to the stairs, and out of the building into the street.

This combination of highly-accurate location information generated by the GNSS receiver 210 and the orientation and rotation information generated by the IMU 220, is one of the features that separates this invention from the navigation aids for visually handicapped in the prior art. Existing systems can guide a visually handicapped person to a general location, but the present invention can guide the person to the exact location (with its highly-accurate, augmented GPS) and, more importantly, direct the person on how to hold the virtual walking stick 10 such that it is pointing directly at an object of importance, such as a mail slot, a crosswalk button, a curb, or the outline of a set of stairs.

In order to provide directions to a visually-impaired person, the virtual walking stick 10 contains audio output circuitry 270, which drives the external speaker 140 (FIG. 1) and audio jack 150 (FIG. 1). Conversely, vocal commands can be given to the virtual walking stick 10 via the microphone 130 (FIG. 1), which is controlled by audio input circuitry 280.

The virtual walking stick 10 also contains haptic feedback circuitry 240. Haptic feedback (also referred to as tactile feedback) is feedback provided to a user in the form of vibration or something detectable through the sense of touch. This haptic feedback may be provided by a small electric motor that spins an off-balance weight to create vibration, or through a piezoelectric device. This type of feedback is useful for communicating when the virtual walking stick 10 is being swept over an object of interest (such as a point of destination) or as a warning when the user is veering off of a directed course.

Input/output processing circuitry 250 is provided to manage button presses and other interactions with the user interface 110 (FIG. 1), as well as other inputs to the system and outputs from the system. For example, the input/output processing circuitry 250 may handle the processing of aural commands spoken into the microphone 130 (FIG. 1).

Finally, battery and power management circuitry 260 is provided to condition the power provided to the various sub-circuits of the virtual walking stick 10, to manage battery power, and to control device recharge.

Operational Scenario.

Now that one physical embodiment of the virtual walking stick has been described in FIG. 1 and FIG. 2, it is appropriate and important to describe one or more operational scenarios and examples in which the virtual walking stick might be used. The general operational scenario of the virtual walking stick is described in the following paragraphs.

The virtual walking stick is a handheld navigational aid designed specifically and primarily for use by the visually-impaired. However, it will be explained shortly that it could be used by sighted individuals, as well, for a number of purposes, from navigation to entertainment. Referring again to FIG. 1 and FIG. 2, under the primary operational scenario, a visually-impaired individual can connect their virtual walking stick 10 to a personal computer or mobile computer with an internet connection using computer port 160 before they embark on a walking trip. This connection will serve both to charge the virtual walking stick 10, if needed, and to make any data exchanges with the personal computer or internet-based applications needed. For example, when plugged in, the virtual walking stick 10 may automatically make requests through the computer to (1) upload any data it may have acquired during a recent trip and (2) download any map updates or software updates required from an internet service.

When the visually-impaired person wishes to go out for the day, they can pick up the device and disengage and unplug it (this may require that the device be "stopped" similar to the way that a USB flash drive needs to be stopped before it is disconnected, and this could be done through one of the user control buttons 110 on the device or perhaps through a vocal command issued into the microphone 130, or some combination thereof).

Once the visually-impaired person (referred to as "user" from here on) has the device, they can initiate a "trip". They can do this in a number of ways. For instance, they can start by simply walking with the device, and having the device report their location periodically as they travel through audible directives. They can also request directions to a specific destination, which might be initiated with a press on one of the user controls 110 followed by a vocal command spoken into the microphone 130. (For example, they may say, "Take me to the Cashwise Supermarket on Egan Avenue" or "Take me to the closest postal station.")

If the user selects a specific destination, the virtual walking stick 10 will determine the best route (optimized for the visually-impaired) and begin issuing vocal directives to the user. Because the virtual walking stick 10 knows its current location as well as its orientation (the direction and angle at which it is pointing, as well as its height off the ground and its latitude and longitude), the device does more than issue simple navigation commands, however. As the user approaches a staircase, for example, the virtual walking stick 10 can announce the approach of the staircase well in advance, and indicate whether the stairs go up or down. When the user is closer to the staircase, the virtual walking stick 10 can then direct the user to hold the device out in front of them (in much the same way they would hold an actual walking stick or cane) and move the barrel 100 of the virtual walking stick 10 slowly back and forth. When the pointing tip 135 is swept across an imaginary boundary marking the outside corners of the staircase, the virtual walking stick 10 can notify the user with a vibration (tactile feedback) or a sound, or both.

Another example might better illustrate how the virtual walking stick 10 uses location plus orientation to achieve its goal. A blind man asks the virtual walking stick 10 to take it to the corporate headquarters building of a business with which he needs to conduct business. The virtual walking stick 10 uses its location sensing abilities to direct the man to the correct address. The building, however, is secure and visitors must be buzzed into the main entrance before they can even see the front desk receptionist. If the building's exterior structural information has been included with the map data that was downloaded into the device, then the virtual walking stick 10 will direct the man to stand in front of the intercom unit on the outside of the building, and will then direct the man to point the device at the building and to move it in one direction or the other until the virtual walking stick 10 senses that it is pointing directly at the intercom unit button. The virtual walking stick 10 may use vibration as the man moves the device to indicate the edges of the intercom unit or to otherwise provide guidance as they are moving the device.

In this example, the map information needed to complete the task (of finding the corporate headquarters building, and then finding the intercom unit specifically) may require very specific map data from the internet not generally loaded on the virtual walking stick 10. In these cases, it may be required for the user to make their request for a destination while the virtual walking stick 10 is still connected to the computer, so that the device can download specific data from the internet as requested (and if authorized to do so, of course).

However, as you can imagine, the specific structural information of a building may not be readily accessible. Many companies may be reluctant to publish this information about their building for security reasons. Even if a company agrees to publish minimal information about their property (such as the latitude, longitude, and height off the ground of their security intercom button, or the boundaries of their handicap accessible ramp), it would be virtually impossible to get this data for all of the buildings in every major city in the world. For this reason, most embodiments of the virtual walking stick 10 will have a feature which will allow a user to touch the pointing tip 135 of the virtual walking stick 10 to an object located in three-dimensional space (a geospatial reference point, or a "geo-point") and to record that geo-point in the memory 230 of the virtual walking stick 10 for later uploading to a server and distribution to other users around the world. In this way, users all over the world will be collecting new geo-points and continuously uploading this data and sharing it with every other user. Map data will be constantly updated in real time with the inclusion of new geo-points targeted for the visually-impaired user. This functionality will be described in more detail later in FIGS. 3, 4, and 5.

The virtual walking stick 10 is used throughout the duration of a trip by a visually-impaired user to navigate both to and from a location, to detect and "feel" known and mapped objects and obstacles on a path, and to record new, discovered objects along the way. Once the trip is complete and the user returns to their home (or their base of operations), they can connect the virtual walking stick 10 to their computer again. Once the computer detects that the virtual walking stick 10 is connected (or upon an intentional initiation by the user), any recorded geo-points are uploaded from the virtual walking stick 10 to an internet-based server, where they are integrated with existing maps and databases. Before the next trip, the user can initiate a download of this updated map data (which now includes their added geo-points, as well as those created by those all over the world) to their virtual walking stick 10.

Example 2

Stargazing

As previously mentioned, the virtual walking stick 10 can be used for purposes other than just as a navigation aid for the visually impaired. Users with sight can use the virtual walking stick 10 as a stargazing tool. Information about the locations of celestial bodies (planets, comets, constellations, etc.) as they would appear at a given geographic location and at a given moment in time can be downloaded into the virtual walking stick 10. Then a user can travel to an appropriate viewing location, ask the device to locate a specific celestial body ("Show me the location of Jupiter", for example), and the virtual walking stick 10 will direct the user to move the device until it is pointing at the location in the sky where Jupiter would be visible (assuming a cloudless night).

Example 3

Geocaching

According to www.geocaching.com:
"Geocaching is a real-world outdoor treasure hunting game. Players try to locate hidden containers, called geocaches, using GPS-enabled devices and then share their experiences online."

In geocaching, a weatherproof box or container holding, at a minimum, a logbook is hidden somewhere on public property, and the people hiding the cache publish the GPS coordinates (latitude and longitude) of the geocache on geocaching-related internet sites. Other geocachers download the coordinates of the hidden caches into their devices and then attempt to find them. If they succeed in finding the hidden treasures, they sign the logbook contained within to prove they were there.

By using the virtual walking stick 10, a third dimension can be added to the activity of geocaching. While a regular GPS device will allow you to locate a hidden geocache, if you approach the same location with a virtual walking stick 10, the device could direct you to find caches hidden in trees (or locations off the ground that require a pointing device such as the virtual walking stick 10), or help you look at a location from a certain angle revealing a message or clue that is only visible when viewed at exactly that angle.

Example 4

Scavenger Hunts/Maze Traversing

The virtual walking stick 10 could be used to lead a user on a scavenger hunt, or to traverse a maze (such as a large corn maze in a field). The user would hold the virtual walking stick 10 and move it back and forth until it made a sound or vibrated, indicating it was now pointing in the right direction. If someone in a corn maze carrying a virtual walking stick 10 with wireless capability were lost, the operators of the maze could transmit the maze solution to the virtual walking stick 10 to bring the users out of the maze.

Having describes the general operational scenario of the virtual walking stick 10, as well as several alternate use examples, we shall now describe the functionality of recording new geospatial data points, or "geo-points" in detail. For the purposes of this specification, a geospatial point or geo-point shall be defined as a location in three-dimensional space, represented by a latitude, a longitude, and an altitude, corresponding to the recorded location of an actual object. More specifically, in the context of this invention, a geo-point shall be the recorded latitude, longitude, and altitude of a point corresponding to an object such as a pedestrian crossing button, the outer corners of a stairway, the location of a mailbox or the slot of the mailbox, etc.

Figure 3:
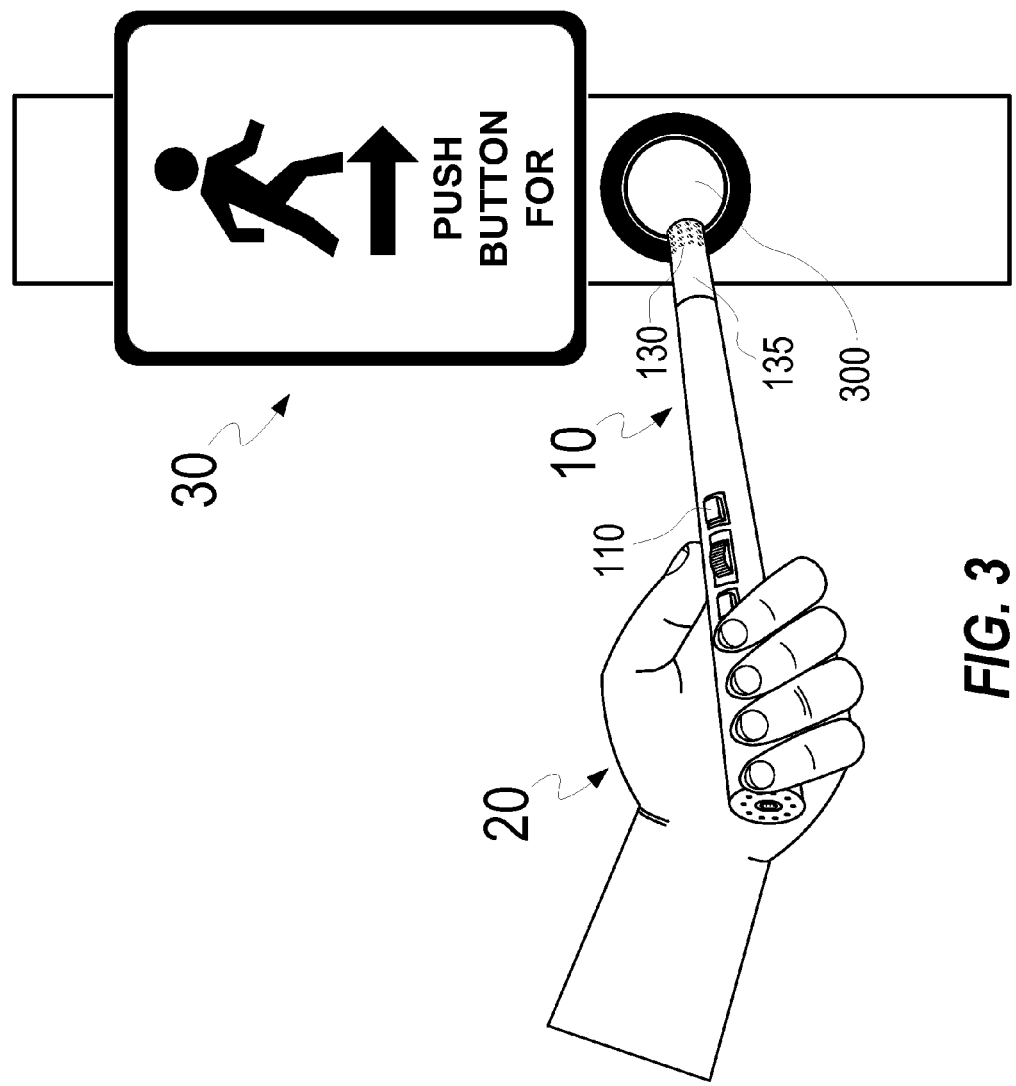
FIG. 3 shows a scenario in which the handheld navigation device described herein can be used to record the three-dimensional location of an object such as a pedestrian crossing button.

FIG. 3 illustrates a scenario in which the virtual walking stick 10 described herein can be used to record the three-dimensional location or geo-point of an object such as a pedestrian crossing button. A user 20 locates an item for which they wish to record the location. In the example in FIG. 3, a pedestrian crossing button 300 is located on a crosswalk signpost 30. The user 20 moves the virtual walking stick 10 such that the pointing tip 135 of the device is resting against the object (button) 300 for which they wish to record a geo-point. When the pointing tip 135 is on or very near the object 300, the user 20 can record the location of the object 300 (create a geo-point) by pressing the appropriate user control 110. Optionally, the user 20 may speak a command into the microphone 130, either to initiate the recording of the geo-point or to add additional information to the geo-point (such as to categorize the geo-point with a verbal "tag").

Figure 4:
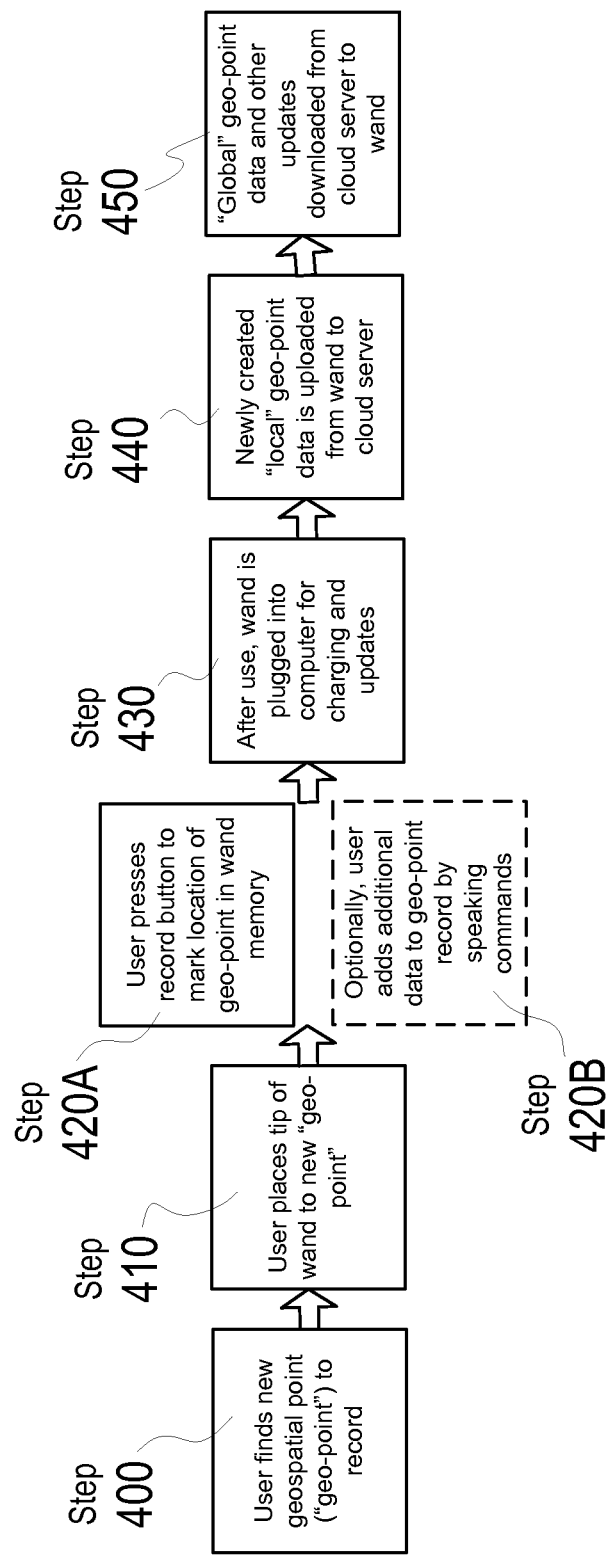
FIG. 4 is a flowchart detailing the steps of recording the three-dimensional location of a new object and propagating that information for use by other users worldwide.

The flowchart of FIG. 4 details the steps of recording the three-dimensional location of a new object (the geo-point) and propagating this information for use by other users worldwide. Steps 400 through 420B describe the actions represented and previously discussed in FIG. 3. In Step 400, a user finds a new geospatial point to record. This will typically be a previously unrecorded location in three-dimensional space that represents something that would be useful to remember. In the case of a visually-impaired person, this might be the location of a pedestrian crossing button (as in the example of FIG. 3), the location of a particularly bad heave in an otherwise smooth walkway, an entry point on a building, the location of an important architectural feature on a building (the location of an electrical outlet on a wall, for instance), and so on. Once located, the user places the tip of the virtual walking stick 10 against the object or geo-point to be recorded (Step 410). Then the user presses a button on the virtual walking stick 10 to record the location and altitude of the object in the device memory (Step 420A), and optionally issues spoken commands to the devices built-in microphone to add detail to the geo-point (such as "This is a crosswalk button") (Step 420B). Steps 400 through 420B may be repeated multiple times throughout a trip, as more geo-points are found and recorded.

At the end of the trip, the wand is plugged back into the computer for charging and updates (Step 430). All of the new geo-points that were created and recorded during the trip are uploaded to an internet-based "cloud server", where they are collected by a database application and integrated into the existing map sets for the corresponding area (Step 440). Finally, before the next trip is begun, newly updated map sets (now containing the geo-points recorded by all virtual walking sticks that have connected to the cloud server that day) are downloaded from the cloud server into the virtual walking stick 10 (Step 450).

In this manner, new geo-points are created daily from hundreds or even thousands of users in parallel, and uploaded and consolidated by a central server application, which then redistributes the updated maps to the navigational devices. Map sets and databases are constantly updated in real-time.

Figure 5:
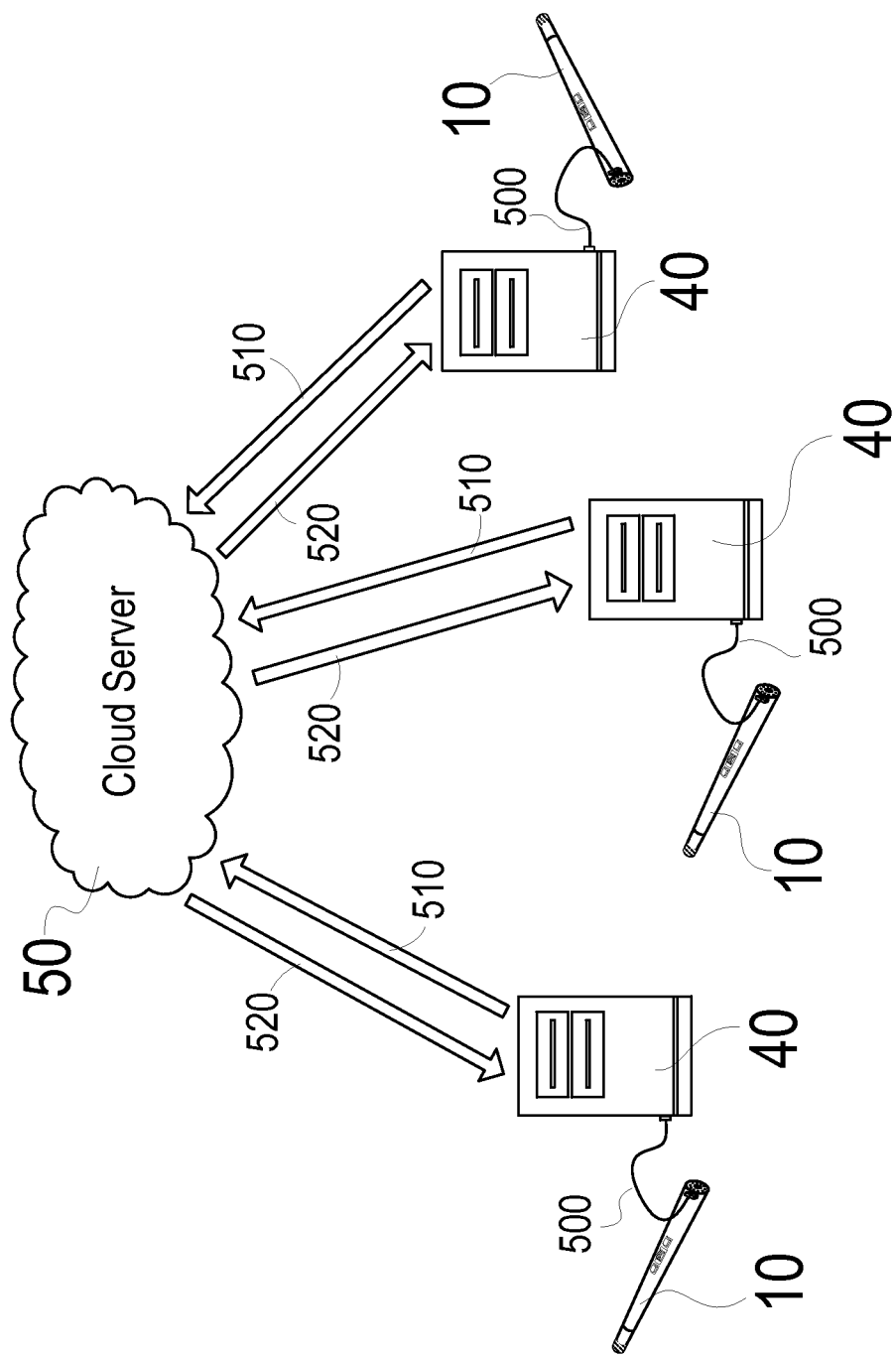
FIG. 5 is a diagram illustrating how data from multiple handheld navigation devices as described herein can be uploaded and compiled for sharing with other users worldwide.

FIG. 5 better illustrates how data from multiple handheld navigation devices can be uploaded and compiled for sharing with other users worldwide. Multiple virtual walking sticks 10 (at locations throughout the world) record new geo-points as described in FIG. 3 and FIG. 4. These virtual walking sticks 10 are connected via a data connection 500 (which could be a hard-wired cable or a wireless data connection) to a personal computer or local server 40. An application on the server 40 then initiates an upload of data 510 to a cloud server 50. The cloud server 50 then integrates the data collected from multiple local servers 40 and then downloads updated map data 520 back to the local servers 40. Local servers 40 provide this new map data to the virtual walking stick 10 over data connection 500 as a software update.

Figure 6:
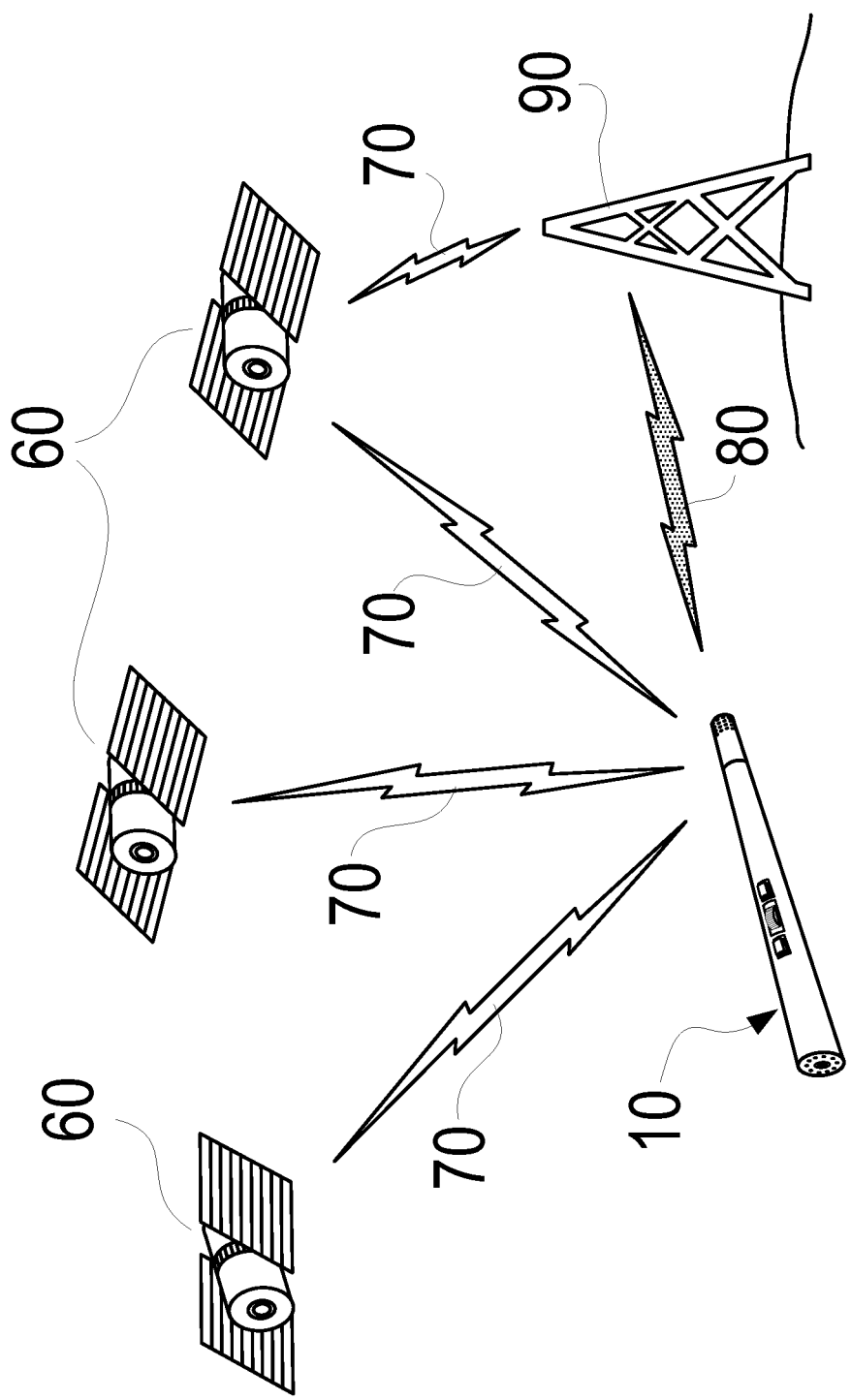
FIG. 6 is a diagram illustrating how the handheld navigation device described herein can accept location correction signals from a fixed, ground-based transmitter as a way of increasing the accuracy of a location signal received by satellite.

FIG. 6 is a diagram illustrating how the handheld navigation device described herein can accept location correction or augmentation signals from a fixed, ground-based transmitter as a way of increasing the accuracy of a location signal received by satellite. As previously explained in this specification, in order for the virtual walking stick 10 to function optimally, it must receive or calculate highly-accurate location information. With a highly-accurate location, the angle-dependent functions of the virtual walking stick 10, such as guiding a blind person to the location of a specific feature on a nearby wall, will be the most accurate. To illustrate this fact, find a feature on a nearby wall (such as a light switch) and point to the feature with a pen. Now, without moving the orientation or direction of the arm holding the pen, step 10 feet to the right or left. Now, instead of pointing at the feature on the wall, the pen is now pointing to a spot 10 feet away from the feature. Although a location accurate to 10 feet is adequate for many routine navigation functions, it can be seen through this demonstration that a 10-foot error in location is not acceptable for pointing at features at close range. Therefore, it may be desirable for the virtual walking stick 10 to receive some kind of location correction signal from an independent source.

Some of this location signal error is accounted for through the use of the IMU 220 (FIG. 2), which can help keep track of position through the use of dead reckoning. Dead reckoning is the process of determining your current position based on a previously known position (or "fix") and then using inertial navigation to keep track of your movements from that known fix. For example, if the home base station (the user's computer where the virtual walking stick 10 is docked when not it use) has a fixed location, then the known coordinates of this base station can be used as a reliable starting point, and as the user moves away from the base with the virtual walking stick 10, the IMU 220 can determine how much the virtual walking stick 10 has moved, rotated, and accelerated from that known starting point. For example, let's assume a person starts at their home (let's call this position [0,0] for this example, where the two numbers represent an offset in meters from a starting location, with the first number representing east-west movement and the second representing north-south movement), and then picks up the virtual walking stick 10 and walk to another room. If they could query the IMU 220 when they reach their destination, they might determine that the IMU 220 recorded them walking 10 meters to the east, then 2 meters north, then 3 more meters east, and then 4 meters south, they would now be able to calculate their new location based on the [0,0] starting point. They would be at location [13, −2], because they moved a net total of 13 meters to the east, and a net total of 2 meters to the south (which we show as negative, assuming positive numbers represent moves to the north, and negative numbers represent moves to the south).

Although having the integrated IMU 200 is very valuable, the use of dead reckoning only works once you have a known good location or fix. If you turned the virtual walking stick 10 on in a location unknown to you, then keeping track of movements from a known location (dead reckoning) does not work, as you do not have a known starting point.

Therefore, it is vitally important, for optimal performance, for the virtual walking stick to have access to highly-accurate location information. One method of augmenting an otherwise inadequate location signal is shown in FIG. 6.

The embodiment shown in FIG. 6 assumes a GNSS (satellite-based) location system. A series of geo-synchronous satellites 60 form a GNSS, and each satellite 60 continuously transmits information 70 to a GNSS receiver (such as the GNSS receiver 210 in the virtual walking stick 10). This information 70 typically includes a very accurate timestamp of when the information 70 was transmitted, as determined by the satellite 60, as well as the position of the satellite 60 as the time the message was transmitted.

Once the information 70 is received by the walking stick 10, the GNSS receiver 210 (FIG. 2, internal to walking stick 10) compares the timestamps it receives from multiple satellites 60, and uses the different delays seen in the receipt of the information 70 from different satellites 60 to triangulate a position. For example, if two satellites transmit a signal at exactly 0100 hours Greenwich Mean Time (GMT), and the virtual walking stick 10 receives the signal from the first satellite a few fractions of a second before it receives the signal from the second satellite, it can deduce that the first satellite is closer than the second satellite, and further use the time delay value and the known location of each satellite to determine its own position (although technically at least three satellites are required to determine a latitude and longitude, this example is illustrative only).

However, using signals received from a GNSS system alone may not provide enough accuracy. Sometimes (especially in the past), the signals sent by satellites of a GNSS system are purposefully obfuscated to limit the accuracy available to certain users. For example, a military force may introduce inaccuracies to a system that only they can correct, providing the military force with location information more accurate than that available to the general public, or, more importantly, to an enemy force. Also, other delays, such as distortions of signals as they pass through the ionosphere, create other, unintentional inaccuracies.

To correct for the inaccuracies, a GNSS augmentation system may be provided. Returning now to FIG. 6, an augmentation system 90, typically consisting of one or more permanent, fixed beacons or towers, is used to transmit an error correction signal 80 to the virtual walking stick 10. The concept behind most augmentation systems 90 is as follows: One or more augmentation system transmitters 90 are mounted in fixed, permanent locations with precisely determined geographical locations. The augmentation system transmitter 90 receives the same information signals 70 from the satellites 60 and uses this information 70 to calculate its location. The augmentation system transmitter 90 then compares this calculated location to its own precisely-known location, and uses the difference between the two to determine the amount of error present in the information 70 received from the satellites 60. The augmentation system transmitter 90 then transmits this error information to the virtual walking stick 10 as an error correction signal 80. The virtual walking stick 10 uses the error correction signal 80 to determine the errors in its own location calculation, and corrects the location information appropriately.

Some augmentation systems transmit corrections from orbiting satellites instead of ground-based transmitters, and these systems are generically referred to as satellite-based augmentation systems, or SBAS.

Examples of SBAS systems in use today include the Wide-Area Augmentation System (WAAS), European Geostationary Navigation Overlay Service (EGNOS), Multi-functional Satellite Augmentation System (MSAS), and GPS-Aided Geo Augmented Navigation (GAGAN), as well as the commercial systems StarFire and OmniSTAR.

Other augmentation systems are based on networks of ground-based reference stations, instead of satellite-based references. These augmentation systems are generically referred to as differential location systems (such as differential GPS, or DGPS, a term used to describe the augmentation of the United States' Global Positioning System using ground-based transmitters).

A specific type of augmentation system that is in increasing use is the real-time kinematic, or RTK, radio system. The RTK system uses a single base station with a known location. The base station receives signals from the GNSS satellites 60, but uses the carrier wave of the information signal 70 instead of the content within the signal 70 to determine a more accurate error correction value.

The goal of an augmentation system is to increase the accuracy of the location information calculated by a system such that the location is accurate to within a few centimeters. This is possible with several of the described augmentation systems, and new methods and systems for creating highly accurate location information are continually being developed and introduced. The intent of the invention described herein is that is be designed such that it can take advantage of the most accurate location information source available, including the available augmentation systems in a region.

Having described the preferred embodiment, it will become apparent that various modifications can be made without departing from the scope of the invention as defined in this document. In particular, different methods of obtaining location and altitude information could be used in place of the GNSS receiver 210 shown in FIG. 2. Devices using ground-based transmissions, for example, might be used in place of receivers getting signals from satellites. Also, alternate technologies to accelerometers and gyroscopes (or alternate configurations of these devices) might be used to obtain orientation information without changing the intent of the invention.

As previously mentioned, the virtual walking stick could incorporate wireless communications, both for local area network connections (such as data transfer to a computer) and for direct connection to the internet or to a cloud server over a cellular data connection or alternate connection means.

For the purposes of this document, the term "cloud server" is used to describe any appropriate internet-based application server. This server could be a single dedicated physical server hosted in a single location, or a true cloud server, a virtual server that relies on shared and available resources as needed. A variation on this idea is using a regional network (not internet-based, but hosting a number of users in a single geographic region) to share collected geo-points. An example of this is a group of users sharing geo-points on a local area network, such as a server set up at a school for the blind.

Specific hardware form factors, configurations, and devices shown in the examples and figures herein are not meant to be limiting. One skilled in the art could see that the design elements could be changed significantly without changing the inventive concept captured. Particularly, the virtual walking stick of the present invention may be designed and incorporated into a full-length walking stick, instead of a shorter, wand-sized form as shown in FIG. 1. Many visually handicapped people rely on the immediate tactile feedback of a full-length walking stick (the vibrations felt and transmitted up the shaft of the stick as it is moved over a surface such as concrete or dirt, as well as the ability to detect obstacles such as a curb, are invaluable sources of information). One embodiment could use a collapsible or telescoping walking stick, such that the walking stick can be used in normal, extended mode for most of the trip, and then collapsed or shortened and used as a wand (as described herein) when the destination is close or actually reached.

Finally, assuming good enough sensors for inertial measurement and location determination, the functionality described herein for a "virtual walking stick" could be achieved with an application hosted on a smart phone or mobile computing platform. This may mean that additional hardware sensing devices, beyond those built into the smart phone or mobile device, might need to be added/attached to achieve the accuracy required. This form factor is less desirable for applications for the visually impaired, as smart phones and mobile devices are typically not designed for use by the visually impaired, and this provides added complexity where it is not needed. However, it is possible to replicate the functionality on a mobile platform. The "processor" 200, and most if not all of the other functionality shown in FIG. 2, could be applied directly to the hardware platform of a smart phone or mobile device.

The invention claimed is:

1. A navigational aid for the visually impaired, comprising a location sensor configured to receiving the current geographic location of the navigational aid including altitude from a global navigation satellite system;
   an inertial measurement unit;
   a computer processor;
   a database containing map data;
   a non-volatile memory; and
   a user interface, wherein the map data comprises geographic location information pertaining to a region in which the navigational aid will be used, wherein the map data further comprises information on a structure of one or more objects within the region, wherein the information on a structure includes data defining at least one outer boundary of the one or more object within the region, wherein the location sensor and the inertial measurement unit are used to compute a location and an orientation of the navigational aid in three-dimensional space, and wherein the navigational aid uses the location and orientation, along with the map data, to provide navigational instructions and angle-dependent directives to a user to locate objects along a travel path without the use of a distance determination device.

2. The navigational aid of claim 1 further comprising a location augmentation system, wherein the location augmentation system provides an error correction signal used by the location sensor to calculate a more accurate location.

3. The navigational aid of claim 1 further comprising a connection to a central server, wherein the navigational aid is configured to record a location of an object in the non-volatile memory, wherein the location of the object is later uploaded to the central server, wherein the location of the object is added to a database of similar location information located on the central server, and wherein the updated location database can be then downloaded from the central server to one or more navigational aids for use.

4. A method of updating a map database comprising the steps of traversing a path with a navigational aid configured to record absolute geographic location and altitude data received from a global navigation satellite system,
   placing a tip of the navigational aid to a point on an object of interest along the path, manually activating a record function of the navigational aid to collect location and altitude data about the point on the object of interest along the path in a non-volatile memory device connected to the navigational aid,
   uploading the collected location and altitude data from the non-volatile memory device to a central server,
   integrating the uploaded location and altitude data into an existing map database, and downloading the updated map database information into one or more navigational aids for future use.

* * * * *